Oct. 24, 1967 F. SICARD 3,349,387

DISPLAY PANEL HAVING SELECTIVELY LIGHTED AREAS FOR REPRESENTING A FIGURE FROM ZERO TO NINE

Filed Jan. 16, 1963 2 Sheets-Sheet 1

INVENTOR
FERNAND SICARD
BY William D. Stokes
ATTORNEY

INVENTOR
FERNAND SICARD
BY William W. Stokes
ATTORNEY 3,349,387

DISPLAY PANEL HAVING SELECTIVELY LIGHTED AREAS FOR REPRESENTING A FIGURE FROM ZERO TO NINE

Fernand Sicard, Le Pecq, France, assignor to Commissariat à l'Energie Atomique, Paris, France Filed Jan. 16, 1963, Ser. No. 251,780
Claims priority, application France, Jan. 23, 1962, 885,576
10 Claims. (Cl. 340—336)

The present invention relates to devices for representing figures, and it is more especially concerned with devices for representing the figures of a number in a decimal numeration system, that is to say the figures ranging from "zero" to "nine" inclusive. However the invention applies in a general manner to the showing of figures ranging from "zero" to "*n*", *n* being at least equal to "two." In particular *n* is equal to "nine" in the decimal numeration system and to "eleven" in the duodecimal numeration system.

There are, on the one hand, devices for representing numbers in the decimal system which comprise electronic tubes capable of directly showing on their fluorescent screen the Arabic characters corresponding to the different values, ranging from "zero" to "nine" inclusive, of the figures of the number to be represented, and on the other hand, devices for representing numbers in the binary system wherein every figure "one" is shown in the form of a luminous spot and every figure "zero" in the form of a dark spot. The first type of devices calls for display tubes which are expensive and delicate and also for complicated means for conversion from the binary system into the decimal system when the numbers to be represented are supplied from a system working in the binary system, whereas the second type of devices is very difficult to read as soon as the number in the binary system comprises more than three binary orders.

On the other hand, there are known systems for representing values such as those used in dominos and playing cards. The different values are then represented by black or red colored areas of small dimensions, the number of which is equal to the number of values to be represented, these areas being distributed in a given manner which permits a quick global counting which can easily be performed after a very short training.

The present invention makes use of this last mentioned representation of points to indicate figures, in particular those of a playing card showing a "nine," to represent a figure in the decimal numeration system.

The invention therefore relates to a device for representing a figure ranging from "zero" to "*n*," *n* being at least equal to "two," which is characterized by the fact that it comprises, in combination, a display member comprising *n* areas each capable of having two different visual appearances, to wit a first appearance in the state of rest and a second appearance in the energized state, these *n* areas being distributed over said display member according to a configuration which permits an immediate total perception of the number of said *n* areas which have the second appearance, and control means capable of shifting from the first appearance to the second appearance a number of said areas equal to the number of units contained in the figure to be displayed.

In the preferred embodiments of this invention, each of said *n* areas is capable of having two different luminous appearances, to wit a first, dark, appearance in the state of rest and a second, luminous, appearance in the energized state, the above mentioned control means serving to bring into the second state a number of areas equal to the number of units contained in the figure to be displayed. In particular said display member may include, in combination, at least one opaque mask provided with *n* apertures which constitute said *n* areas respectively, and elements disposed behind said mask and adapted to be illuminated in response to the operation of said control means, one of said elements being disposed so that it can be seen through only one of said apertures and at least one of said elements being disposed so that it can be seen through two of said apertures.

When it is desired to represent a decimal number, that is to say a number ranging from "zero" to "nine," inclusive, said displaying member comprises nine areas preferably distributed in a manner analogous to that used for the colored spots of a playing card showing a "nine."

It will be noted that the device according to the present invention permits not only an easy reading, but also, when this is necessary, a transmission of the figure that is displayed, in the form of an electric voltage which is a linear function of the number of units of said figure. For this purpose the above mentioned *n* areas, each capable of having two different appearances, have all the same area and are all of the same luminosity in the dark state on the one hand, and in the illuminated state on the other hand, and the device further comprises a linear photo-electric converter, capable of converting the total illumination of its photo-sensitive element into a voltage which is a linear function of said total illumination and which is available at the output thereof, and an optical system adapted to form the image of the whole of said *n* areas on said photo-sensitive element, the illumination of the image formed by said optical system of each of said *n* areas in the bright state being substantially the same for all of them.

Preferred embodiments of the present invention will be hereinafter described with reference to the appended drawings, given merely by way of example, and in which:

FIG. 1 diagrammatically shows a preferred construction of a display member for a decimal figure in a device according to the present invention;

In the following description it will be supposed that the device serves to represent a figure of a number in a decimal numeration system.

Figure 1:
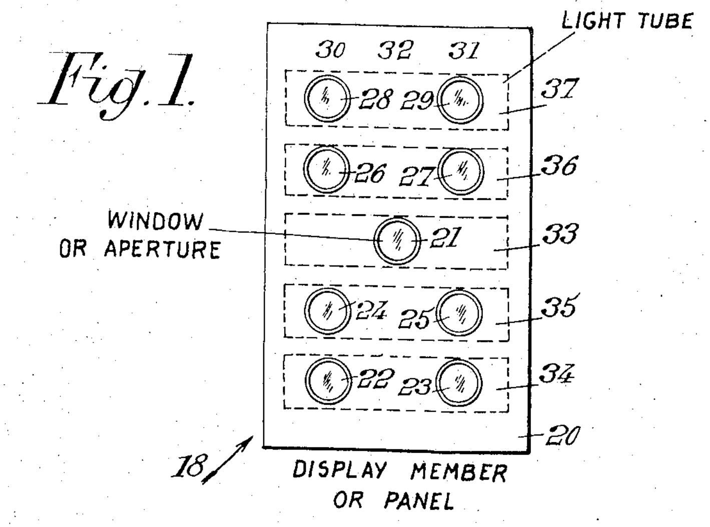

Referring first to FIG. 1, which diagrammatically shows a preferred embodiment of the display member 18, it will be seen that this member comprises, to represent a figure in the decimal numeration system, a rectangular opaque mask 20 provided with nine apertures 21, 22, 23, 24, 25, 26, 27, 28 and 29. These apertures are circular and distributed like the points of a playing card showing a "nine," which means that they form two main side rows 30 and 31, each of which comprises four apertures 22–24, 26–28 and 23–25, 27–29 respectively, and a third row 32, centrally located, comprising a single aperture 21. The arrangement of apertures 22 to 29, which form the two main rows, is symmetrical with respect to the aperture 21 of the third row.

Behind this mask 20 are arranged five tubes disposed perpendicularly to the direction of the main rows, to wit a first tube 33, located behind aperture 21 and hereinafter called "odd tube" because it is visible through an odd number of apertures (one) and four other tubes 34, 35, 36 and 37, each disposed behind two corresponding apertures 22–23, 24–25, 26–27, 28–29 of the two main rows, these four last mentioned tubes being hereinafter called "even tubes" because each of them is visible through an even number of apertures (two).

In a broader manner, in order to represent a number of units ranging from "zero" to "n", n being at least equal to "two" and for instance, equal to "nine," the display member 18 is made to comprise *n* areas adapted to have two different visual appearances (in particular two different illuminations), to wit a first appearance (in particular a dark appearance) when in the state of rest and a second appearance (in particular an illuminated appearance) in the energized state, these *n* areas being distributed over the display member in such manner as to permit an immediate perception of the number of said areas which have the second appearance. If *n* is an odd number and equal to $2m+1$, with *m* ranging from "two" to "five" inclusive (in particular equal to 4) said *n* areas are disposed to form two main parallel side rows including each *m* areas and a third central row comprising a single area, in such manner as to facilitate a reading of the number of areas having the second appearance.

The display member is operated through control means capable of shifting from the first appearance (in particular the dark appearance) to the second appearance (in particular the illuminated appearance) a number of areas equal to the number of units of the figure to be represented. In particular in order to operate the display member 18 shown by FIG. 1, the control means must ensure, to represent:

figure "zero," no illumination of any of the tubes;
figure "one," illumination of odd tube 33;
figure "two," illumination of one of the even tubes 34 to 37;
figure "three," illumination of one of the even tubes 34 to 37 and of odd tube 33;
figure "four," illumination of two of the even tubes, preferably the two even tubes disposed symmetrically with respect to tube 33, in order to facilitate the reading of the figure that is represented;
figure "five," illumination of the two even tubes, preferably symmetrical with respect to tube 33, and of tube 33;
figure "six," illumination of three even tubes;
figure "seven," illumination of three even tubes and of tube 33;
figure "eight," illumination of the four even tubes 34 to 37;
figure "nine," illumination of the four even tubes and of tube 33.

Figure 2:
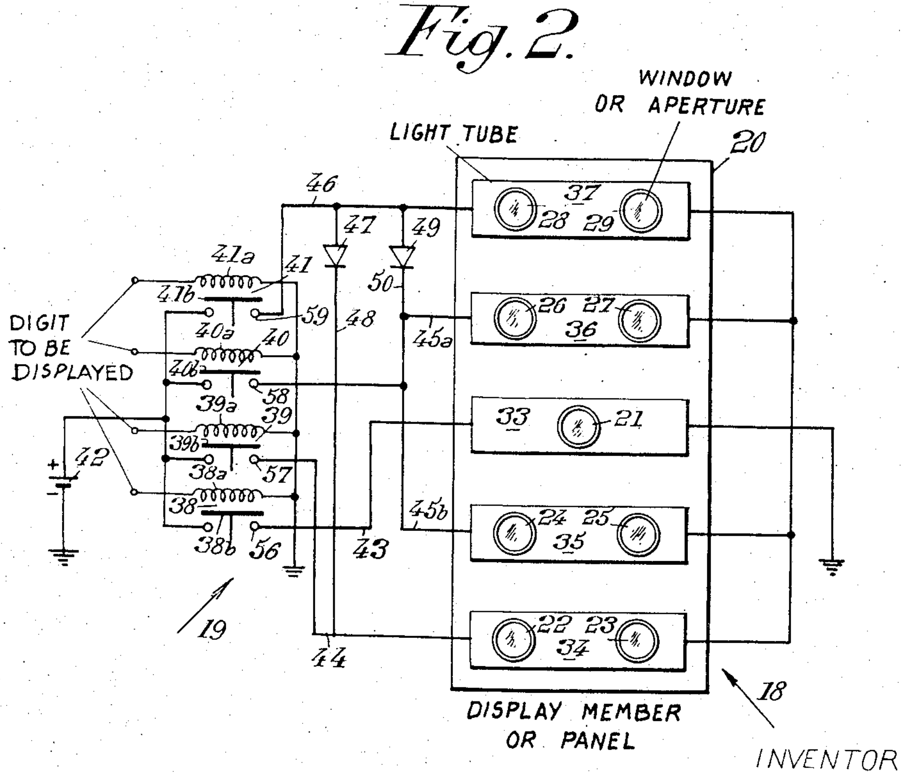
FIG. 2 shows a first embodiment of a representation device according to the invention.
Figure 3:
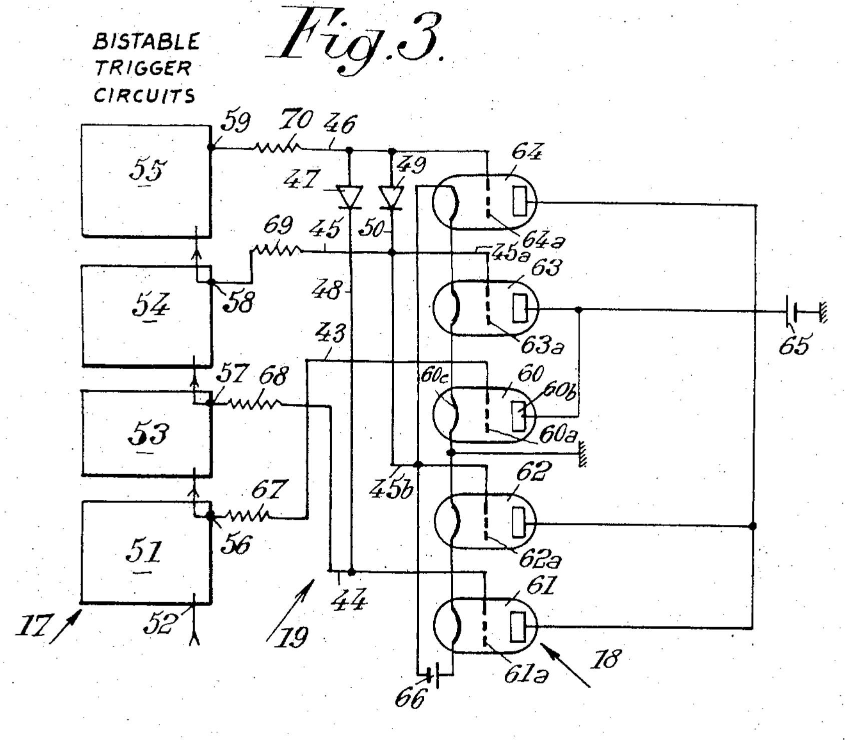
FIG. 3 shows a second embodiment of such a device.

Two embodiments of a device for representing a decimal number (including a display member 18 and control means 19) are illustrated by FIGS. 2 and 3, respectively.

In the construction of FIG. 2, control means 19 are actuated by relays 38, 39, 40 and 41, the respective windings 38*a*, 39*a*, 40*a*, 41*a* of which are fed by the digits, of respective weights "one," "two," "four" and "eight," of a decimal number expressed in code 1–2–4–8.

The closing of contacts 38*b*, 39*b*, 40*b* and 41*b* feeds current from direct current source 42 respectively to the inputs 56, 57, 58 and 59 of control means 19 and consequently switches on:

through conductor 43, tube 33 which displays one unit through aperture 21;
through conductor 44, tube 34 which displays two units through apertures 22 and 23;
through conductors 45, 45*a*, 45*b*, tubes 35 and 36 which display four units through apertures 24, 25, 26 and 27;
through conductor 46, diode 47 and conductors 48, 44, and through diode 49 and conductors 50, 45*a* and 45*b*, tubes 37, 34, 35 and 36 which display eight units through apertures 22 to 29 respectively.

Diodes 47 and 49 ensure the starting of tubes 34, 35 and 36 when relay 41 is to be fed with current while preventing tube 37 from being started by the feed of current to relays 39 and 40.

It will be seen that the device of FIG. 2 permits of displaying in the decimal form a figure ranging from "zero" to "nine" incluisve, arriving through a parallel binary code system without requiring a complicated conversion system, by means of a source of current, four relays, two diodes (or rectifiers of any suitable type), a mask and five tubes. Since tubes 35 and 36 are always started or stopped simultaneously, it is possible, in a modification of the tubes, to replace these two rectilinear tubes 35 and 36 by a single U-shaped tube disposed behind apertures 24, 25, 26, 27; this single U-shaped tube being fed through conductor 45 under control of relay 40. In both cases (i.e. those of five or of four tubes) only reliable and relatively cheap elements are used.

On the contrary the usual solution of displaying a decimal figure which makes use of a decimal tube of the "dekatron" type requires, in addition to this costly and delicate tube, a relatively complicated device for converting binary into decimal signals since the information to be displayed is generally available in the binary form.

An electronic embodiment of the invention, without relays, permitting operation at a higher frequency is illustrated by FIG. 3. In this embodiment of the invention, control is ensured by means of a system 17 consisting, in the known manner, of four bistable multivibrators, for instance of the Eccles-Jordan type, and making use of transistors, to wit:

a trigger circuit 51 for the first binary order receiving at its input 52, in the binary series system, the binary digits (or bits) of the figure to be displayed;
a trigger circuit 53 for the second binary order receiving the output from trigger circuit 51;
a trigger circuit 54 for the third binary order receiving the output from trigger circuit 53; and
a trigger circuit 55 for the fourth binary order receiving the output from trigger circuit 54.

Every trigger circuit may comprise for instance two transistors, one of which is conducting and the other is cut off, the input transistor being cut off and the output transistor being conducting when the trigger circuit is in state "zero," whereas the input transistor is conducting and the output transistor is cut off when the trigger circuit is in state "one." An embodiment of such a trigger circuit forming an elementary binary counter and an embodiment of a decade with four trigger circuits are described and illustrated in the McGraw-Hill Encyclopedia of Science and Technology, volume 3, pages 518–520 (in particular Fig. 3, page 519 and Fig. 3, page 518 respectively).

Output then takes place on the collectors of the output transistors of the four trigger circuits at 56, 57, 58 and 59 for the first, second, third and fourth binary orders respectively, that is to say for weights "one," "two," "four" and "eight" respectively. As the variation of voltage on the collectors of the output transistors that results from the switching of these transistors from the cut-off state to the conducting state and inversely, averages three volts, use is made, as tubes adapted to be illuminated, of cathode ray indicators 60, 61, 62, 63, 64, for instance of the "DM 160" type, having a green fluorescence (corresponding to tubes 33, 34, 35, 36 and 37 respectively) which are switched on and off for variations of voltage of some volts applied to their grids 60*a*, 61*a*, 62*a*, 63*a*, 64*a*. The anodes, such as 60*b*, of the DM 160 tubes are fed with current under a voltage of about 40 volts from a voltage source 65, whereas a current source 66 serves to the series heating of the cathodes, such as 60*c*.

Resistors 67, 68, 69, 70 serve to connect the outputs 56, 57, 58 and 59 (of the collectors of the output transistors of the bistable trigger circuits or multi-vibrators 51, 53, 54 55) with the grids 60*a*, 61*a*, 62*a*, 63*a* and 64*a* of the indicator tubes. The resistance (for instance 500 kilohms) of elements 67, 68 and 69 is much higher than the resistance (for instance 50 kilohms) of element 70, through which flows the feed current of all the tubes, with the exception of tube 60, owing to rectifiers 47, 49 consisting advantageously of germanium diodes.

The feed voltage in series of the cathodes, such as 60c, of indicators 60, 61, 62, 63 and 64 is such that the mean potential of the cathodes is approximately "zero" when the outputs 56, 57, 58 and 59 of decade 17 are in the "zero" state. The cathode ray indicators are then out of action. As soon as one of the outputs 56, 57, 58, 59 receives a negative voltage averaging three volts, which represents state "one" for the corresponding trigger circuit 51, 53, 54, 55, the indicator or indicators connected with this output are switched on, diodes 47 and 49 playing the same part as in the embodiment of FIG. 2.

FIG. 3 does not show the mask provided with nine apertures disposed in front of the cathode ray indicators 60–64, because this mask may be the same as that shown at 20 in FIGS. 1 and 2.

Figure 4:
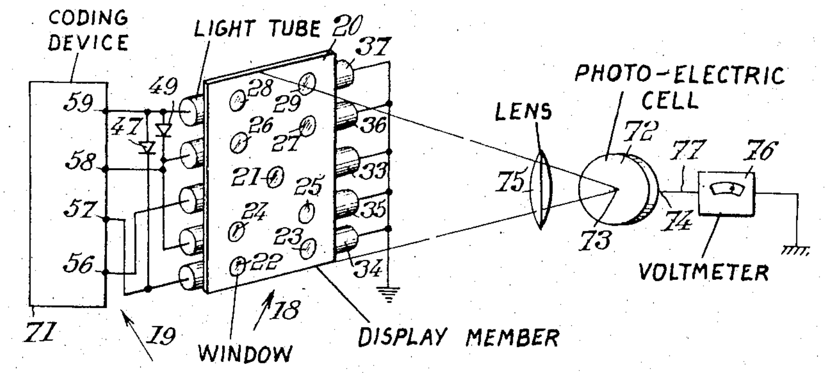
FIG. 4 shows an embodiment of a representation device, according to the invention, provided with means for transmitting the indication of the member that is displayed in the form of an electric voltage.

FIG. 4 shows the means for transmitting the figure that has been displayed, this transmission taking place in the form of an electric voltage which is a linear function of the number of units of said figure. The display member 18 is, for instance, of the type illustrated by FIG. 1 and it comprises in this case a mask 20 provided with nine apertures 21 to 29 disposed in respective positions corresponding to the colored areas of a "nine" playing card and five tubes 33 to 37 fed in a manner illustrated by FIG. 2 from the input terminals 56, 57, 58 and 59 of a coding device 71 supplying all the figures ranging from "zero" to "nine" in the parallel binary code. This coding device 71 may be a coding device with relays of the type illustrated by FIG. 2 or a coding device of the type illustrated at 17 in FIG. 3, and in this case, the tubes disposed behind mask 20 are advantageously cathode ray indicators of the type shown by FIG. 3.

In order to permit transmission to a distance of the figure displayed on member 18, that is to say of the number of apertures 21 to 29 that are illuminated, said apertures are all made of the same area and tubes 33–37 (or the corresponding cathode indicators) have all the same illumination both in the dark state and in the luminous state, whereby the illumination through the apertures of mask 20 is proportional to the number of apertures that are illuminated and therefore to the figure that is displayed.

There is further provided a photo-electric cell 72 of the linear type, that is to say capable of converting the total illumination received on its photo-sensitive element 73 into a voltage the value of which is a linear function of said total illumination, this voltage being available at the output 74, and an optical system 75 (diagrammatically illustrated by a lens for the sake of simplicity) arranged to form the image of the whole of the nine apertures 21 to 29 upon photo-sensitive element 73, the illumination upon the photo-sensitive element of the image of each of the apertures that are in the luminous state being substantially the same.

Owing to this arrangement, photo-electric cell 72 supplies at its output 74, a voltage proportional to the number of apertures that are illuminated and consequently to the figure that is displayed. This voltage is measured for instance by means of a voltmeter 76 which displays in analogic form the value which is indicated in the numeric form in member 18. This voltage may also be recorded by a suitable device.

Since it is possible to provide a transmission to some distance (for instance by means of a cable 77 or in wireless fashion) between photo-electric cell 72 and voltmeter 76, the figure displayed in member 18 may be easily transmitted to a distance.

In a modification of the distance transmission system for the figure that is displayed, one might provide, instead of the addition of the illumination (through optical system 75 and photo-electrical cell 72), an electrical addition of the currents flowing through those of the tubes 33 to 37 that are on. This addition of currents may be made through means well known to anyone skilled in the art.

Whereas the invention is being more particularly described in the case of the display of a decimal number ranging from "zero" to "nine," it should be well understood that it might be applied to the display of figures in other numeration systems, for instance in the duodecimal system.

In a likewise manner, the drawings show embodiments of the invention wherein the areas of variable appearance, and in particular the apertures, are disposed in the same manner as the colored areas of a playing card representing a "nine." Such an arrangement is of course not limitative. It suffices to make use of an arrangement permitting an immediate reading of the figure that is displayed. In order to facilitate readings, it is always advantageous to dispose the areas of apertures along three rows, to wit two parallel side rows such as 30 and 31, every even tube then illuminating as many apertures in the first side row as in the second side row (generally one aperture in every side row) and a third central row comprising only one area or aperture adapted to be illuminated by an odd tube. The reader of the figure that is displayed then quickly gets accustomed to pay attention only to the number of area having changed in appearance in one of said side rows, because he knows that the number of areas having changed of appearance in the other side row is the same. Furthermore, a distribution of the areas as symmetrically as possible with respect to a line perpendicular to the rows and passing through the area of the central row facilitates reading. Of course there might be provided several distinct opaque masks, for instance, a mask with one or two opening for every tube 34 to 37 or 60 to 64. The openings in the masks might also be of noncircular shape.

In a general manner, while the above description discloses that are deemed to be practical and efficient embodiments of the invention, said invention is not limited thereto as there might be changes made in the arrangement, disposition and form of the parts without departing from the principle of the invention as comprehended within the scope of the appended claims.

In all cases the invention permits of obtaining a device which ensures a quick and easy reading even by persons which have no experience, said device being easy to manufacture with electronic components which are cheap, strong and safe. Furthermore, it may be easily acted upon, without a complicated conversion system, by the binary output of a unit for transmitting information. The indication supplied by the device can be transmitted to a distance in analogous form.

What I claim is:

1. A device for representing a figure ranging from "zero" to "nine," which device comprises, in combination, a display member of nine areas each capable of having two different visual appearances, one, a dark appearance in the state of rest and, second, a luminous appearance in the energized state, said nine areas being distributed over said display member according to a configuration which permits total perception of the number of said nine areas which have said luminous appearance, and control means capable of shifting from the dark appearance to the luminous appearance a number of said nine areas equal to the number of units contained in the figure to be displayed, said display member comprising in combination, at least one opaque mask provided with nine apertures which constitute said nine areas respectively, and five elements disposed behind said mask and adapted to to be illuminated in response to the operation of said control means, one of said elements being disposed so that it can be seen through only one of said apertures the remaining four of said five elements being disposed to that each can be seen through two of said apertures.

2. A device according to claim 1 wherein, in order to permit transmission of the figure that is represented in the form of an electric voltage which is a linear function of the number of units of said figure, said nine areas capable of having two different luminosities having all the same area and showing the same luminosity in the dark state, on the one hand and in the luminous state, on the other hand, said device further comprising a linear photo-electric converter capable of converting the total illumination of its photosensitive element into a voltage which is a linear function of said total illumination, said voltage being available at the output of said converter, and an optical system arranged to form the image of the whole of said areas over said photosensitive element, the illumination of the image of each of said areas in the luminous state that is formed on said optical system being equal for all of said areas.

3. A device for representing a figure ranging from "zero" to "nine" which device comprises, in combination, a display member comprising nine areas each capable of having two different visual appearances, to wit a first appearance in the state of rest and a second appearance in the energized state, said nine areas are disposed so as to form two main parallel rows, each of four areas, and a third row consisting of a single area, and control means capable of shifting from said first appearance to said second appearance a number of said areas equal to the number of units contained in the figure to be displayed.

4. A device according to claim 3 wherein said third row, which comprises a single area, is located between said two main rows.

5. A device for representing a figure ranging from "zero" to "nine," which device comprises, in combination, a display member comprising one opaque mask with nine apertures distributed in a manner similar to those of the spots of a playing card showing a "nine," that is to say along two side parallel rows each comprising four apertures and a third central row comprising a single aperture at the center of symmetry of said two side rows, a first tube adapted to be switched on or off disposed behind said mask so as to be visible through said aperture of said third row and other tubes, each adapted to be switched on or off, disposed behind said mask so as to be visible through pairs of apertures located respectively in said two side parallel rows, and control means adapted to switch on said first mentioned tube when the figure to be represented is odd and to switch it off when said figure is even, and to switch on the other tubes respectively so that the total number of pairs of apertures thus illuminated is equal to the numbers of pairs of units contained in the figure to be represented.

6. A device for representing a figure ranging from "zero" to "nine," which device comprises, in combination, a display member comprising at least one opaque mask with nine apertures distributed in a manner similar to those of the spots of a playing card showing a "nine," that is to say along two side parallel rows each comprising four apertures and along a third central row comprising a single aperture at the center of symmetry of said two side rows, a first tube adapted to be switched on or off disposed behind said mask so as to be visible through said aperture of said third row and four other tubes, each adapted to be switched on or off, disposed behind said mask so as to be visible each respectively through one pair of apertures located respectively in said two side rows, and control means adapted to cause illumination of said first mentioned tube when the figure to be represented is odd and to switch it off when said figure is even and to switch on the other tubes respectively so that the total number of pairs of apertures thus illuminated is equal to the numbers of pairs of units contained in the figure to be represented.

7. A device according to claim 6 wherein said control means consist of a decimal system comprising binary elements arranged according to the 1–2–4–8 code, having four inputs for the signals of the successive binary orders of weights "one," "two," "four" and "eight," respectively, said means being adapted to switch on the first mentioned tube in response to a signal on the first input corresponding to weight "one," to switch on one of said four other tubes in response to a signal on the second input, corresponding to weight "two," to switch on a second and a third of said four other tubes in response to a signal on said third input, corresponding to weight "four" and to switch on all four other tubes in response to a signal on the fourth input, corresponding to weight "eight" respectively.

8. A device according to claim 7 wherein, on the one hand, the first and the last of said four other tubes are disposed symmetrically with respect to said first tube and on the other hand the second and the third of said four other tubes are disposed symmetrically with respect to said first tube.

9. A device for representing a figure ranging from "zero" to "nine," which device comprises, in combination, a display member of nine areas each capable of having two different visual appearances, one, a dark appearance in the state of rest and second, a luminous appearance in the energized state, said nine areas being distributed over said display member according to a configuration which permits an immediate total perception of the number of said nine areas which have said second appearance, andt control means capable of shifting from the dark appearance to the luminous appearance of said nine areas equal to the number of units contained in the figure to be displayed, said display member comprising one opaque mask with nine apertures distributed in a manner similar to those of the spots of a playing card showing a nine, that is to say along two side parallel rows each comprising four apertures and a third central row comprising a single aperture at the center of symmetry of said two side rows, a first tube adapted to be switched on or off disposed behind said mask so as to be visible through said aperture of said third row and three other tubes, each adapted to be switched on or off, disposed behind said mask, the first and third of said three other tubes being visible respectively each through one pair of apertures located respectively in said two side parallel rows and the second of said three other tubes being visible through two pairs of corresponding apertures belonging to said first and second rows respectively and disposed symmetrically with respect to said single aperture of said third mentioned row, said control means being adapted to switch on said first mentioned tube when the figure to be represented is odd and to switch it off when said figure is even, and to switch on the other tubes respectively so that the total number of pairs of apertures thus illuminated is equal to the numbers of pairs of units contained in the figure to be represented.

10. A device according to claim 9 wherein said control means consist of a decimal system comprising binary elements arranged according to the 1–2–4–8 code having four inputs for the signals of the successive binary orders of weights "one," "two," "four" and "eight" respectively, said means being adapted to switch on the first mentioned tube in response to a signal over the first of said inputs, corresponding to weight "one," to switch on the first of said three other tubes in response to a signal on the second of said inputs, corresponding to the weight "two," to switch on the second of said other tubes in response to a signal on the third of said inputs, corresponding to weight "four" and to switch on all said three other tubes in response to a signal on the fourth of said inputs, corresponding to weight "eight," respectively.

(References on following page)

References Cited

UNITED STATES PATENTS

| | | | |
|---|---|---|---|
| 1,268,162 | 6/1918 | Scalbom | 340—378.1 |
| 1,771,953 | 7/1930 | Conklin | 340—332 |
| 2,307,173 | 1/1943 | Vian | 340—336 |
| 2,452,288 | 10/1948 | Blando | 340—323 |
| 2,521,225 | 9/1950 | Kearney | 340—332 |
| 2,843,845 | 7/1958 | Vozza | 340—378.2 |
| 2,918,608 | 12/1959 | Reith | 340—336 X |
| 2,950,418 | 8/1960 | Reis | 340—336 X |
| 2,992,364 | 7/1961 | Rasmussen | 340—336 X |
| 3,011,153 | 11/1961 | Haselton | 340—336 X |
| 3,032,686 | 5/1962 | Mathis | 340—336 X |
| 3,081,450 | 3/1963 | Sinninger | 340—336 |

NEIL C. READ, *Primary Examiner.*

H. I. PITTS, *Assistant Examiner.*